Figure 1:
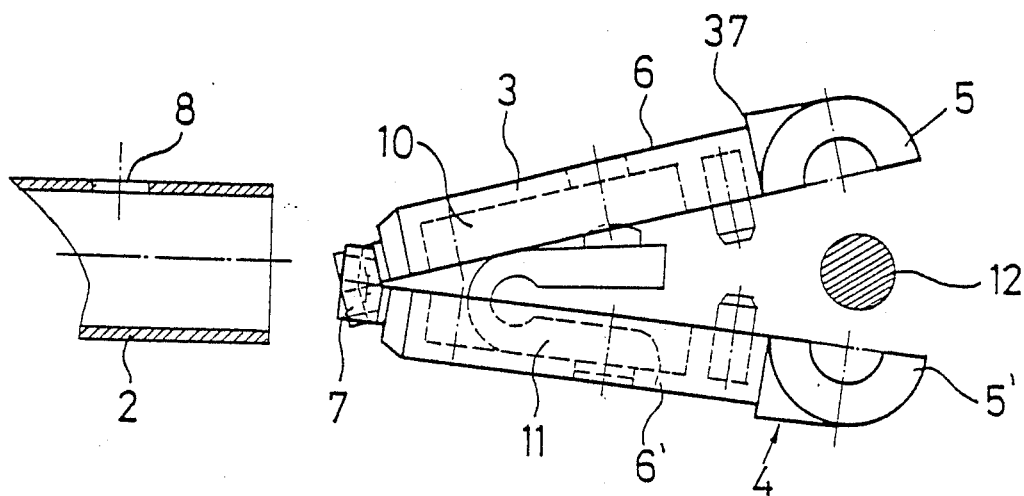

United States Patent [19]

Zwissler

[11] Patent Number: 4,829,735
[45] Date of Patent: May 16, 1989

[54] FRAMEWORK COMPRISING BAR-SHAPED ELEMENTS

[75] Inventor: Ruedi Zwissler, St. Gallen, Switzerland

[73] Assignee: Entwurf Partner Ruedi Zwissler, St. Gallen, Switzerland

[21] Appl. No.: 95,538

[22] PCT Filed: Nov. 25, 1986

[86] PCT No.: PCT/CH86/00163

§ 371 Date: Jul. 27, 1987

§ 102(e) Date: Jul. 27, 1987

[87] PCT Pub. No.: WO87/03346

PCT Pub. Date: Jun. 4, 1987

[30] Foreign Application Priority Data

Dec. 2, 1985 [CH] Switzerland ............ 5152/85

[51] Int. Cl.$^4$ ............................ E04H 12/18
[52] U.S. Cl. .................... 52/646; 403/297; 403/190
[58] Field of Search ........... 52/646; 403/174, 175, 403/170, 190, 191, 217, 274, 327

[56] References Cited

U.S. PATENT DOCUMENTS 1,322,801 11/1919 Lewis ................... 403/190
2,762,639 9/1956 Molter et al. .
2,941,294 6/1960 Vosbikian et al. .
4,290,244 9/1981 Zeigler .
4,353,661 10/1982 Rüther ................... 403/292 X
4,549,832 10/1985 Sterl ................... 403/297 X
4,580,922 9/1986 Coppa ................... 403/170 X

FOREIGN PATENT DOCUMENTS 0106016 4/1984 European Pat. Off. .
2015312 10/1970 Fed. Rep. of Germany .
2024508 12/1971 Fed. Rep. of Germany .
2251228 6/1975 France .
2563293 10/1985 France .
84/01094 3/1984 World Int. Prop. O. .

Primary Examiner—David A. Scherbel
Assistant Examiner—Creighton Smith
Attorney, Agent, or Firm—William R. Hinds

[57] ABSTRACT

Connecting elements (4) can be inserted into the ends of the individual bar-shaped elements (2), the connecting elements having a projection (13) which engages into an opening (8) at the end of the tube. In that way each individual connecting element (4) can be released even in a framework construction which has already been assembled. The bar-shaped elements (2) are exchangeable and the framework can be broken down into all individual parts.

14 Claims, 16 Drawing Sheets

FIG. 24
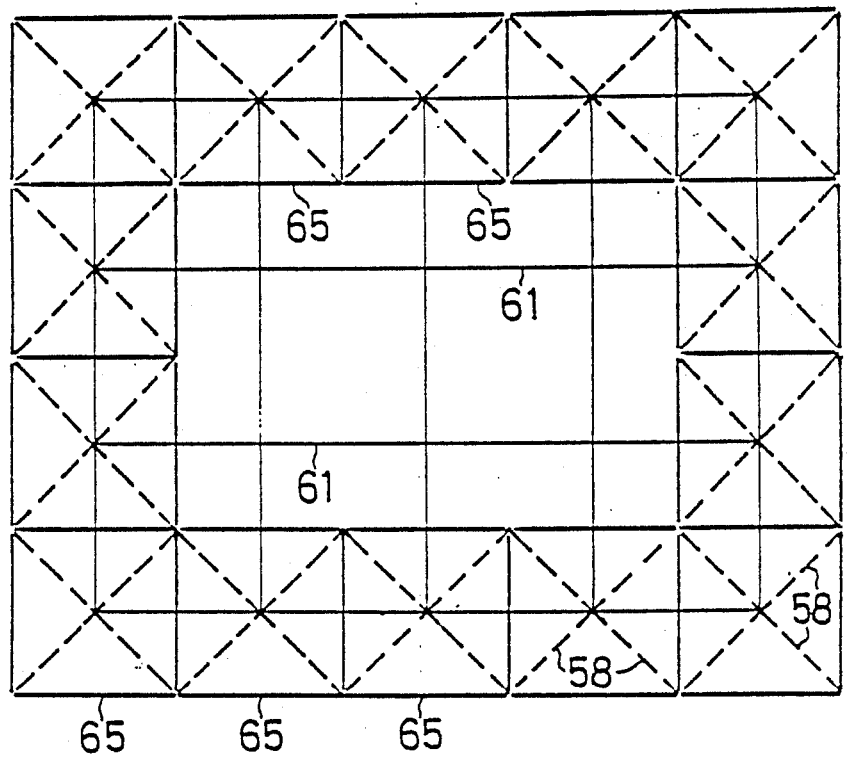
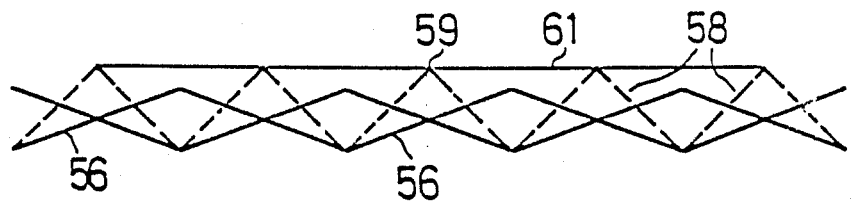
FIG. 25

FRAMEWORK COMPRISING BAR-SHAPED ELEMENTS

The invention relates to a framework comprising bar-shaped elements as set forth in the classifying portion of claim 1. Such frameworks permit a three-dimensional structure to be quickly erected, for a very wide range of purposes. They are increasingly used nowadays for example in exhibition construction for building up viewing wall structures or for the construction of entire stand structural assemblies. It is also possible however to envisage the construction of furniture or auxiliary emergency accommodation as well as domes of the like.

Frameworks which are comparable in terms of the general kind of concept involved are disclosed for example in U.S. Pat. No. 4,290,244 or WO-A No. 84/01094. In the constructions described and illustrated therein, the connecting elements are fixedly pressed into the ends of the barshaped elements, with a respective plurality of connecting elements being fixedly linked together at an intersection or junction point. The frameworks practically exclusively consist of bars which cross in a shears-like configuration so that the framework can be folded together or fixed in the erected condition. A disadvantage of those constructions is in particular that it is only possible to build up a quite definite structure in each case. It is not possible for the user to make modifications or to add or omit individual elements as the individual components of the framework are fixedly interconnected. In addition the removal of an individual component of the overall structure would have the result that the entire structure would become unstable.

An object of the present invention is therefore to provide a framework of the kind set forth in the opening part of this specification, which permits a wide multiplicity of building structures and which can be broken down into all individual parts. The invention also seeks to provide that the framework permits modifications on existing structures so that the user is not reliant on skilled labour if he wants to make structural alterations on site at short notice. In addition the invention seeks to provide that versatile structures can be produced with the minimum number of individual components, while the user can combine the individual components as desired on the building-brick principle.

In accordance with the invention that object is achieved with a framework having the features of claim 1.

The projection or lug on the shank of the connecting element, which can engage into the opening in the peripheral portion of the tube, permits the connecting element to be removed in any condition. Thus for example individual tubes can be removed on an existing structure and replaced by other tubes of different lengthwise dimension. If the bar-shaped elements are tubes, they may even be cut to any desired size, in which case it is only necessary to bore the opening in the peripheral portion of the tube at the correct location. In addition the structure can be completely broken down into its individual parts so that for example the same bar-shaped elements can be provided with different connecting elements for building different structures. That provides a building brick system which on the one hand has a given number of types of bar-shaped elements and on the other hand a given number of types of connecting elements.

The engageable lug or projection may be produced in a particularly simple manner by the shank having an opening in which a spring element carrying the projection is mounted. The resilient projection thereby becomes a separate component so that production of the connecting element can be simplified. Furthermore, in that way it is possible to select the desired spring force, depending on the respective configuration of the spring element, as required, and damaged projections can be replaced without the entire connecting element being rendered useless in that situation. It is also possible for the spring element to be produced from a different material from the remainder of the connecting element.

The connecting element enjoys a wide variety of connecting options if it has a connecting portion, which projects out of the end of the tube, with a gripping means. The gripping means serves as a support for adjacent connecting elements and/or for passing through or engaging a fixing screw, a pin or another spindle element, or for engaging a ball or the like.

The function of the gripping means is particularly efficient if the connecting elements are split in the plane of the axis of the tube and the gripping means comprises two half-shell members which are closed when the shank is pushed in. In that arrangement the half-shell members may be both spherical for engaging a ball and also hollow-cylindrical or such as to have a polygonal cross-section, for gripping a shaft or spindle member. It will be seen that the two half-shell members may be closed around an existing ball or shaft or spindle member, thus producing a hinged or non-rotatable connection which however can be released at any time. The connecting elements can be produced and handled in a particularly rational manner if the two halves are separate parts which can be joined together at one end by means of an engagement device and which are hingedly interconnected in that way. With the correct configuration, the two halves may be absolutely identical parts which can be assembled together to provide a symmetrical body. The hinge-like connection at the engagement device prevents the two halves from coming apart upon dismantling. If the angle of opening is correctly delimited, the spring element is prevented from falling out.

Versatile options in regard to combination of the bar-shaped elements are provided if the gripping means can be connected to a core portion which is provided at its outside with coupling means which fit positively into the half-shell members. In that way a plurality of bars can be connected to provide a junction, while each individual bar can be removed at any time by opening the gripping means.

If the core portion is substantially quadrangular and is provided an each side with respective pairs of axial cut-out portions, each of which can accommodate a gripping means, two bars can be connected on one side. That makes it easy to build three-dimensional structures as well as constructing foldable structures with mutually intersecting bars.

Preferably the elements which cross each other in a scissor-like or shears-like configuration are releasably connected together at their points of intersection. In that way it is also possible for an individual scissor or shears assembly to be completely broken down so that it is also possible to put together scissors assemblies with different bar lengths.

Further advantages can be achieved if the framework has a basic element comprising two mutually intersecting planar and rectangular frames, wherein the elements which intersect in a scissors-like assembly respectively form parallel frame sides. Any number of connecting elements can be connected in all three three-dimensional axes in the same manner to such a basic element, thus providing a framework consisting of a plurality of mutually intersecting frame planes. That basic configuration has the advantage that it does not require any troublesome diagonal connections between mutually intersecting pairs of bars. Both the individual frame planes and also the planes between the sides of two adjacent frames thereby remain free for configurational design purposes. Viewing panels, panes, transparent members and the like can be fitted into or gripped in said planes.

The framework enjoys a particular level of stability and torsional strength if the bar-shaped elements are tubes whose peripheral surface is formed with axially extending grooves. The grooves also improve the external appearance and make it easier to grip the tubes. If the tube body is of a corrugated configuration in cross-section, that improves the stretchability of the ends of the tubes in the radial direction. In addition the shanks of the connecting elements can be better inserted because the area of the inside surface is reduced by the corrugated shape and thus a smaller amount of friction has to be overcome. The grooves on the outside also give the advantage that they form a retaining or detent arrangement in the peripheral direction, so that for example clamps and the like can be fixed in position at a given angle.

Figure 2:
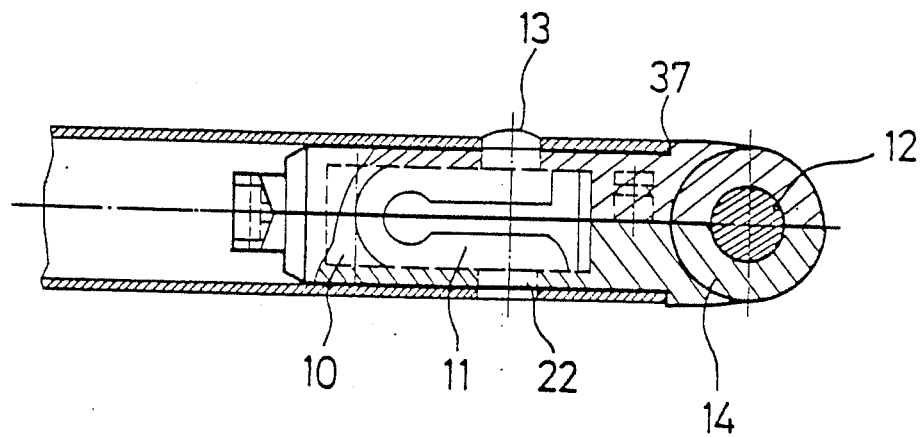
Figure 3:
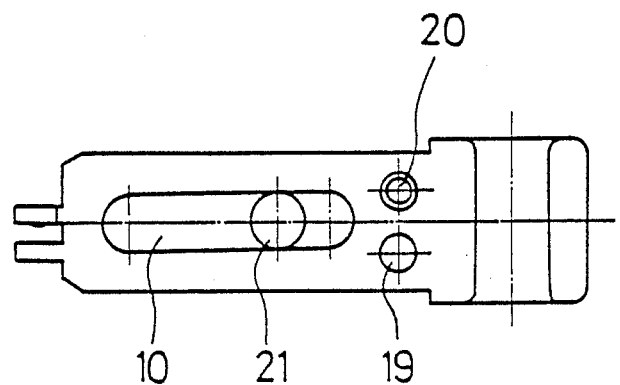
Figure 4:
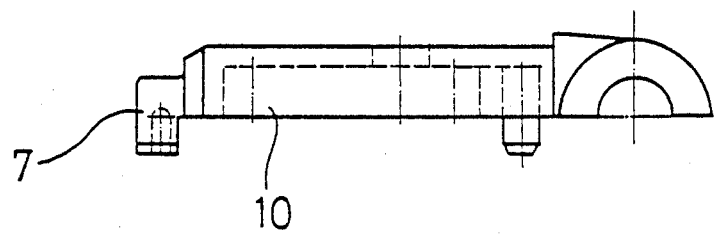
Figure 5:
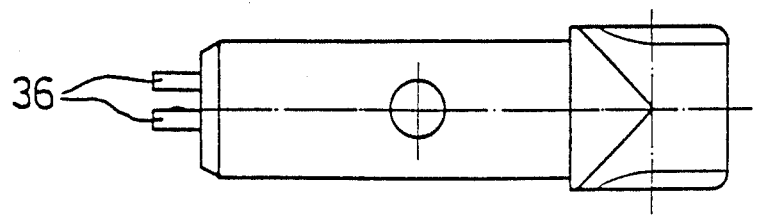
Figure 6:
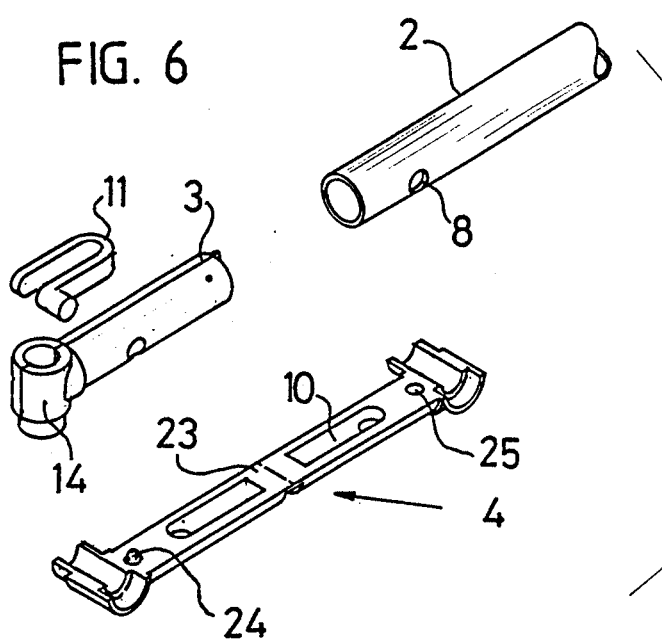
Figure 7:
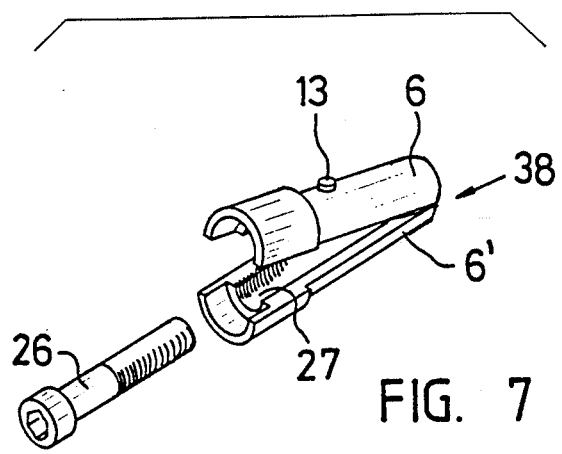
Figure 8:
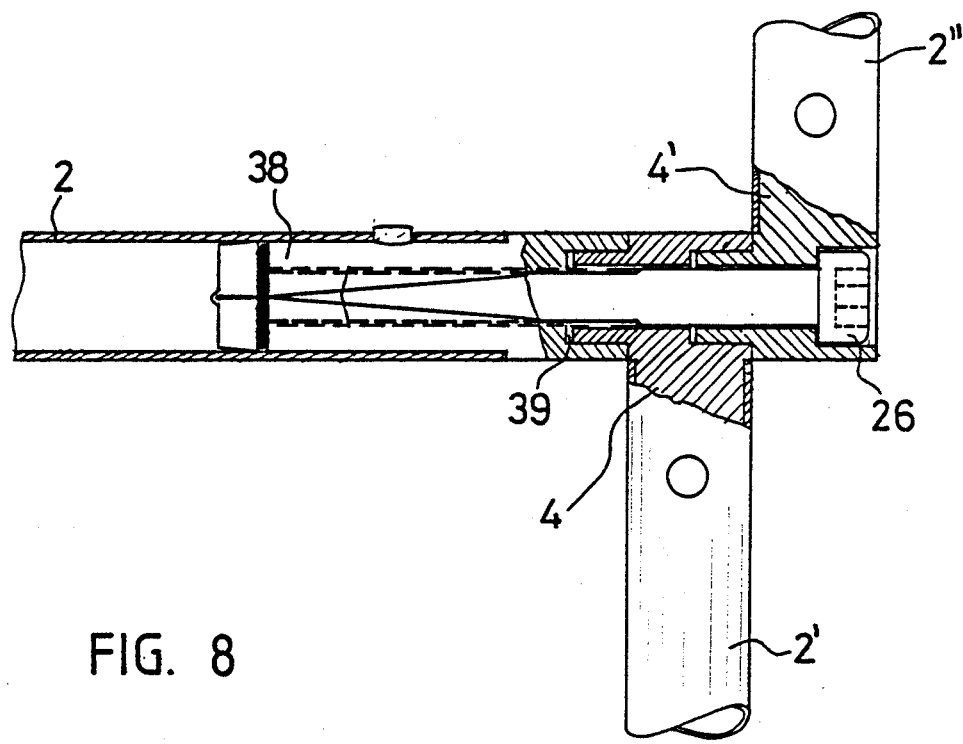
Figures 9, 10:
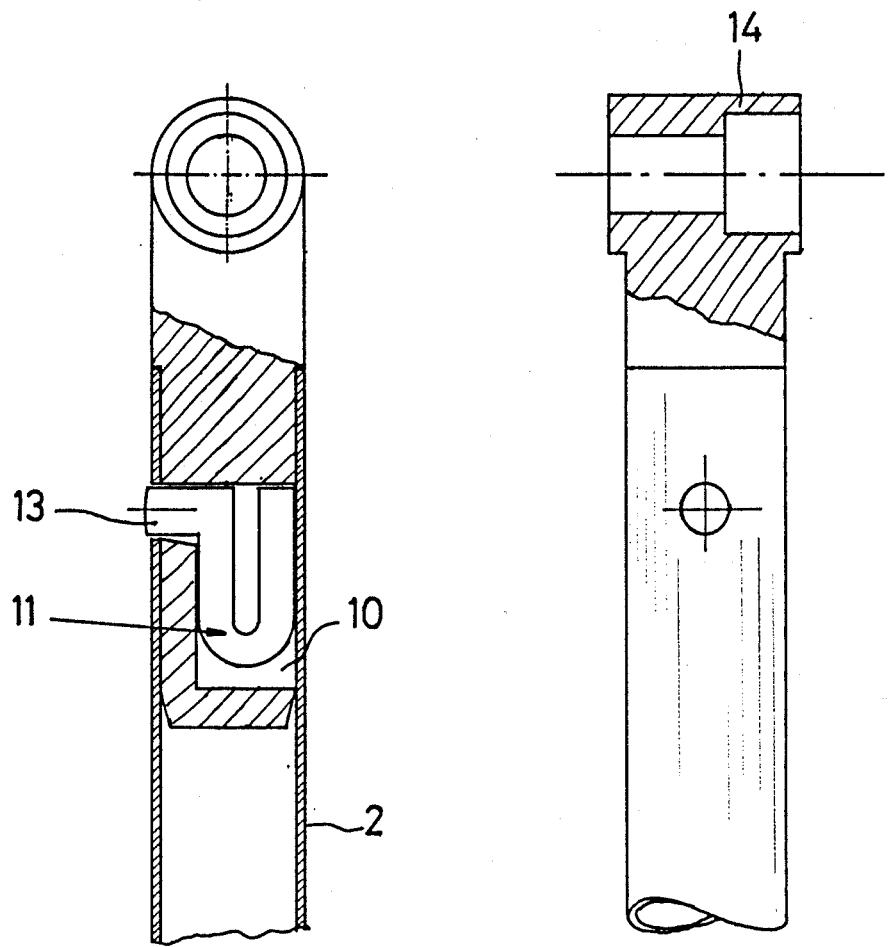
Figure 11:
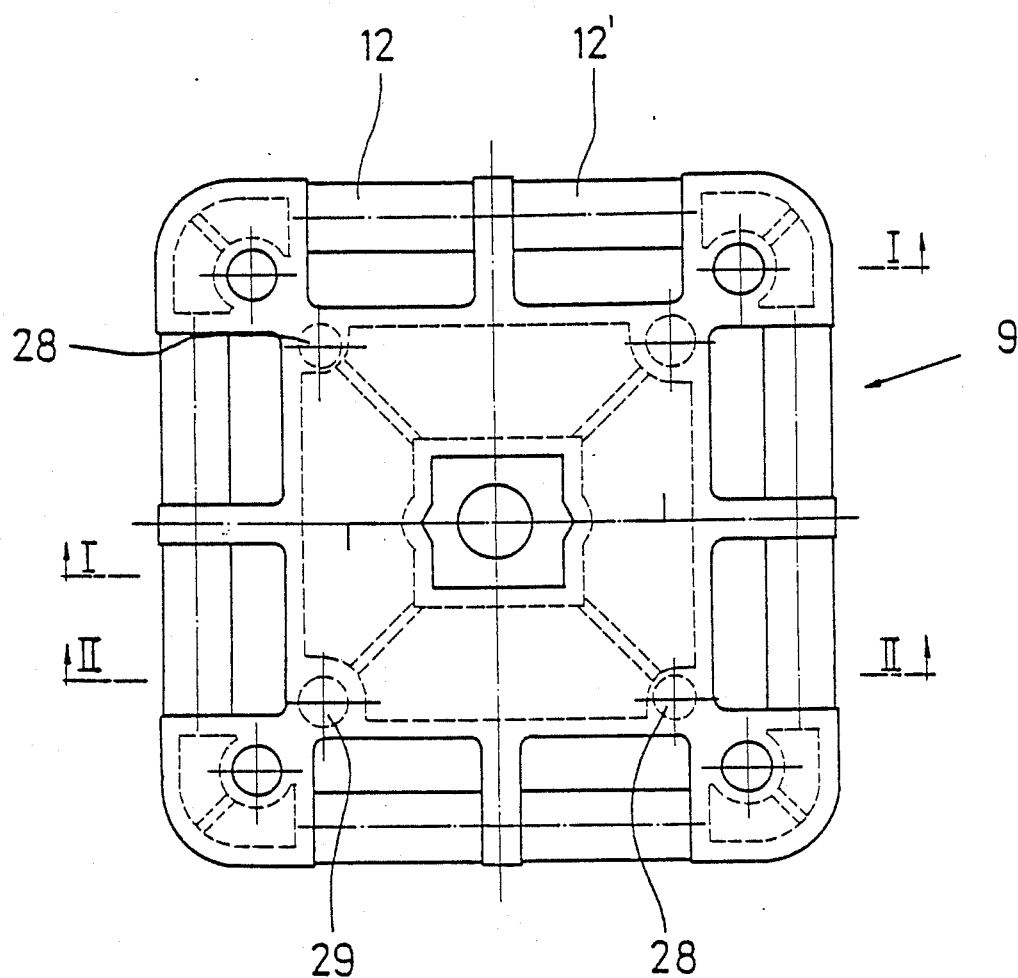
Figure 12:
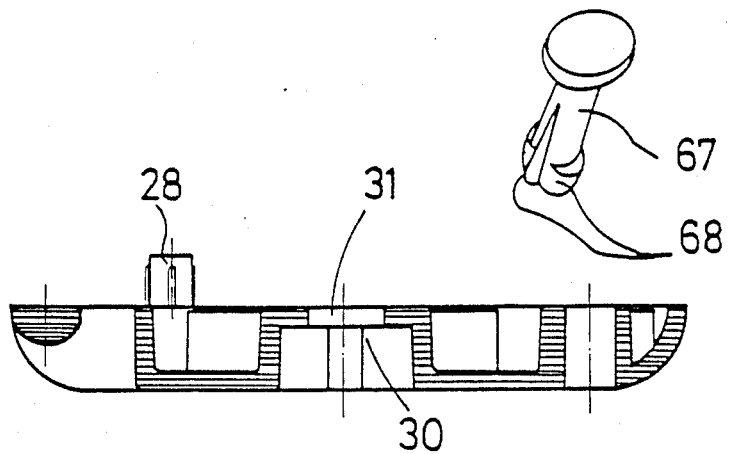
Figure 13:
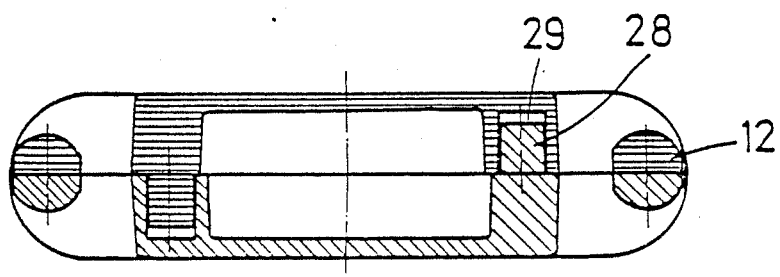
Figure 14:
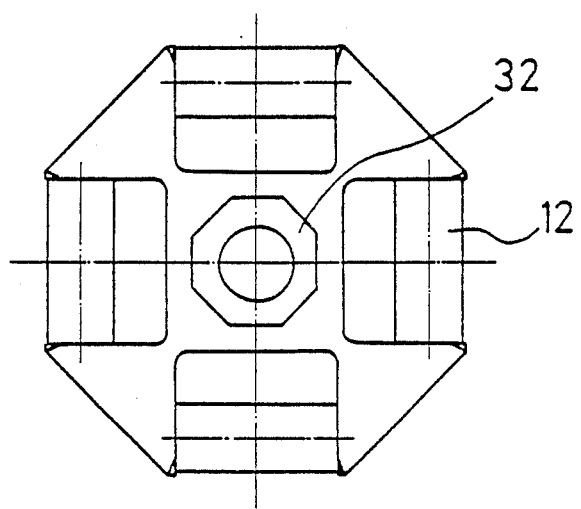
Figure 15:
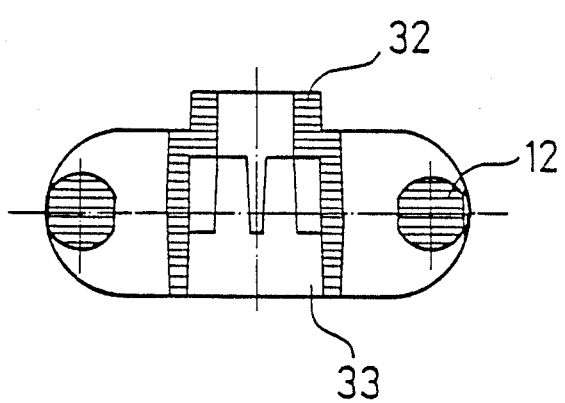
Figure 16:
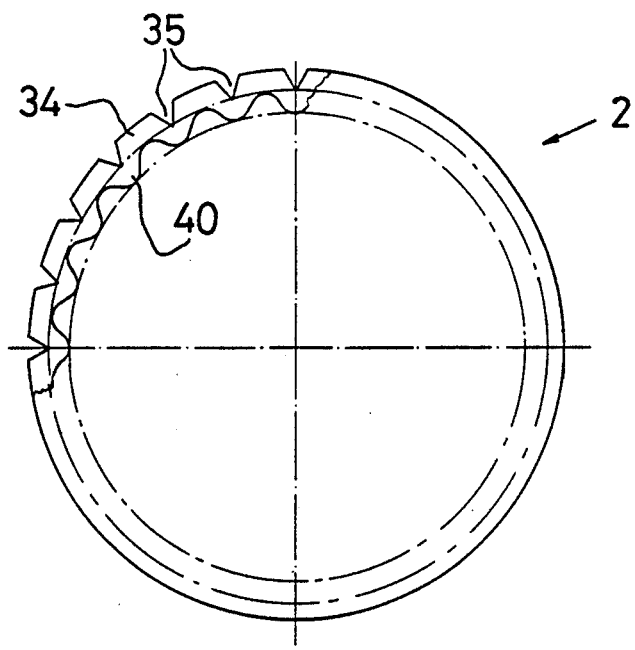
Figure 17:
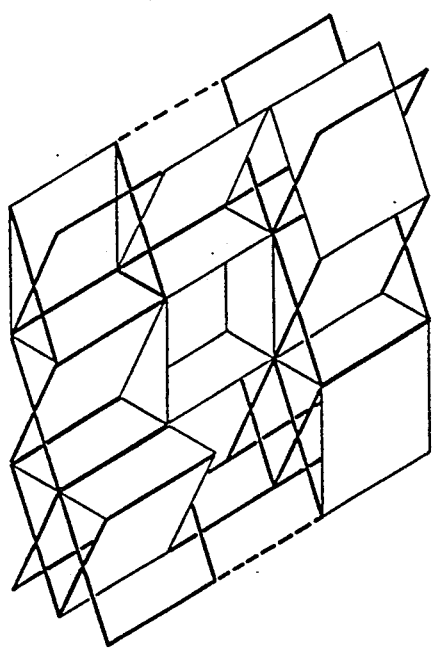
Figure 18:
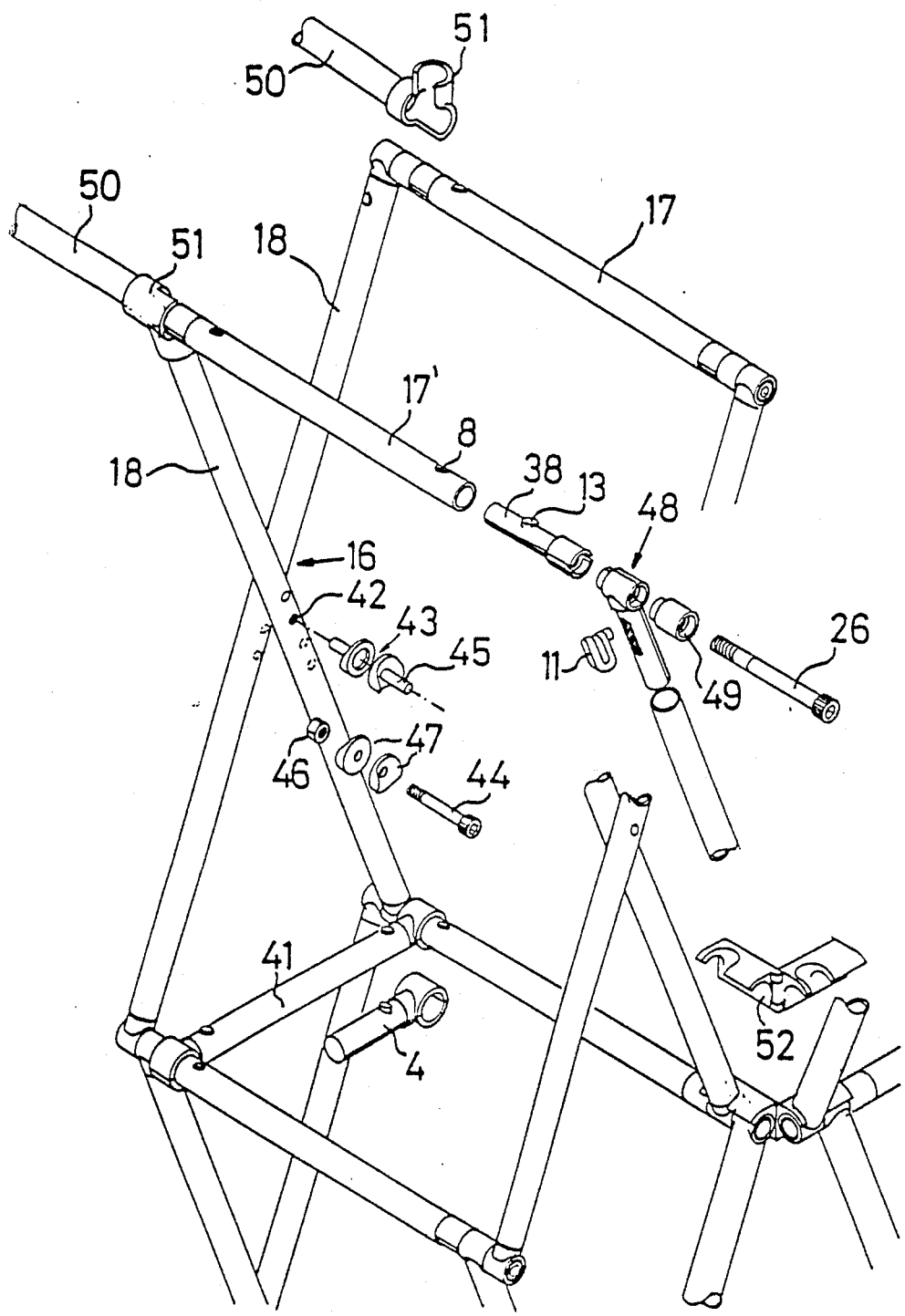
Figure 19:
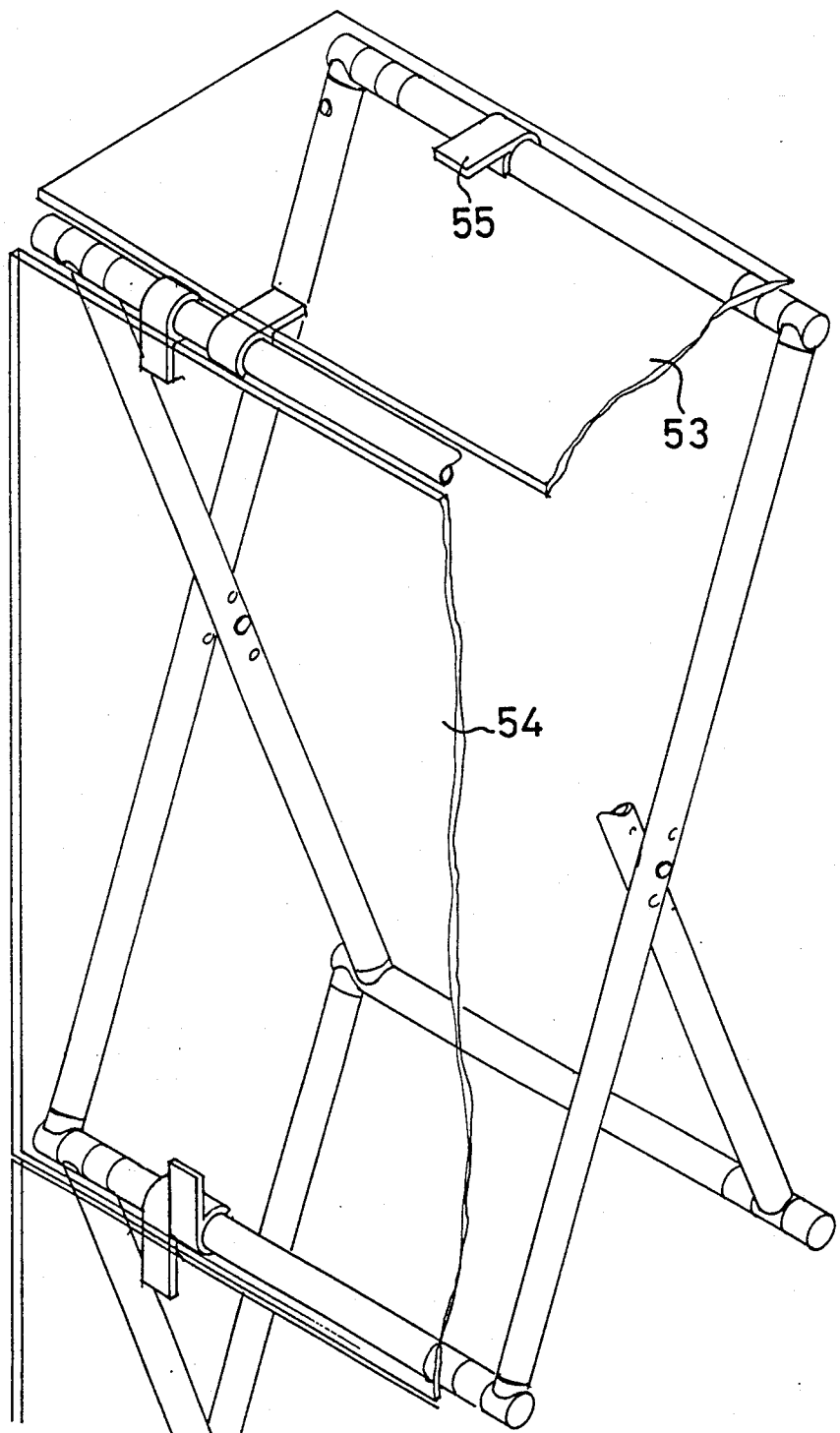
Figure 20:
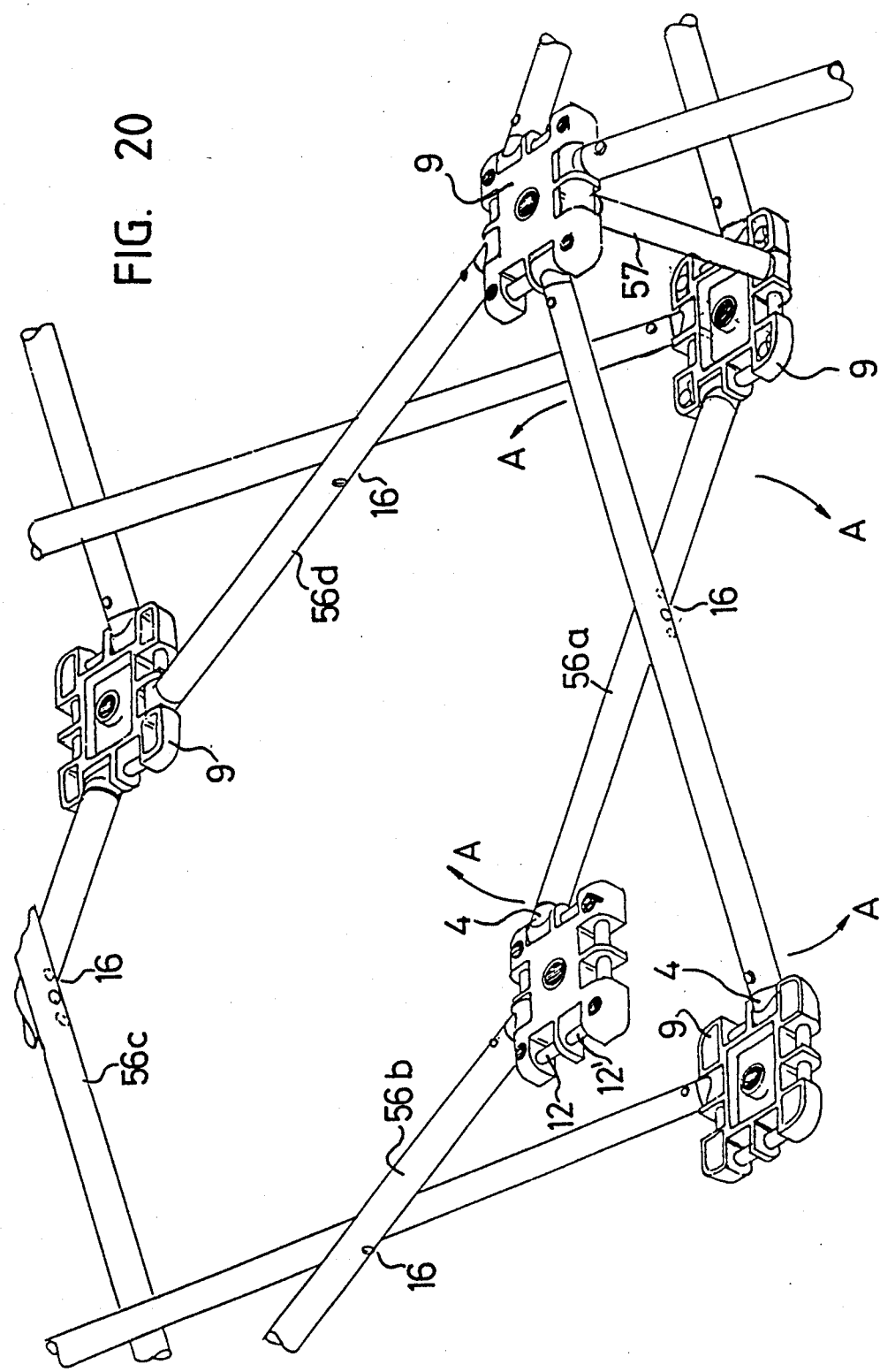
Figure 21:
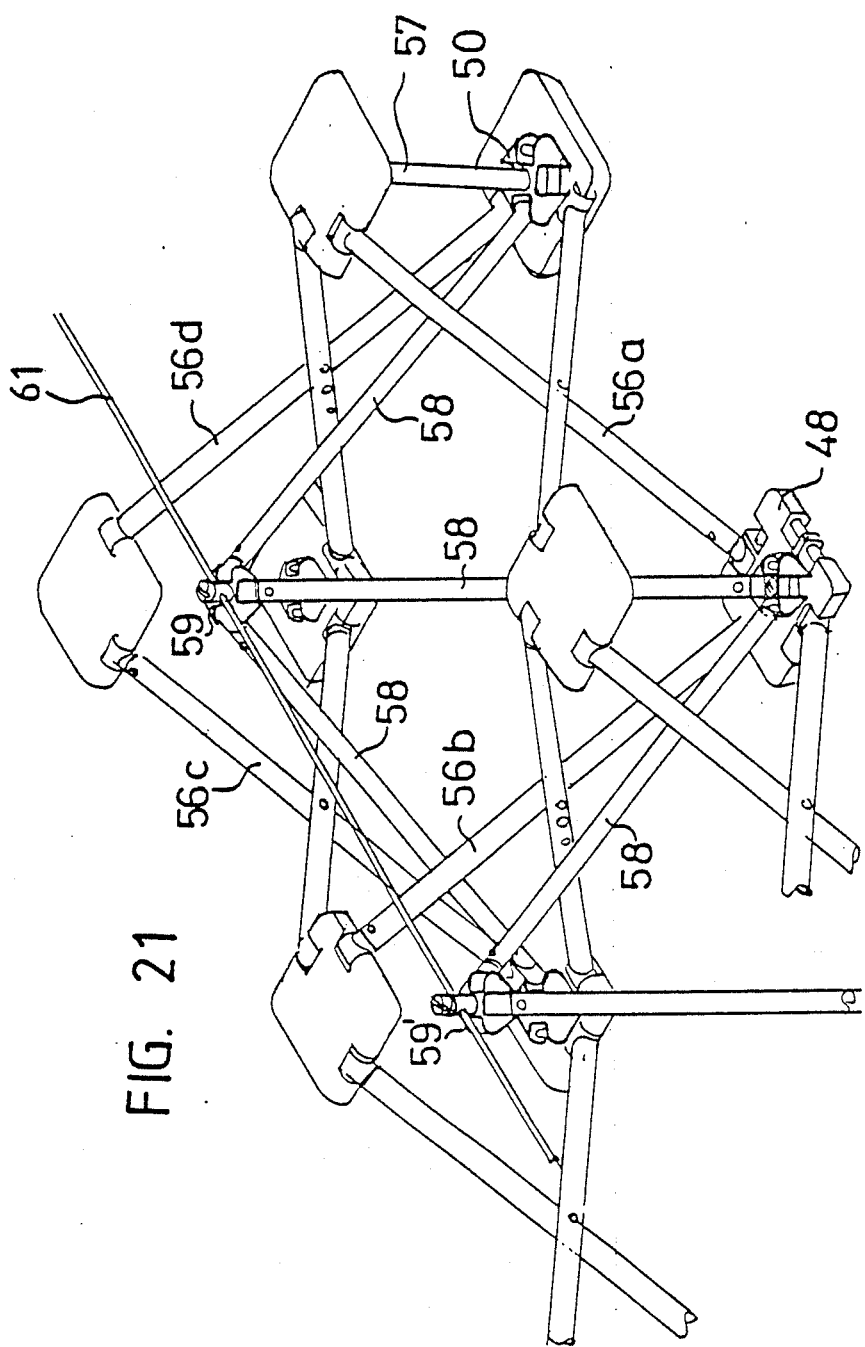
Figure 22:
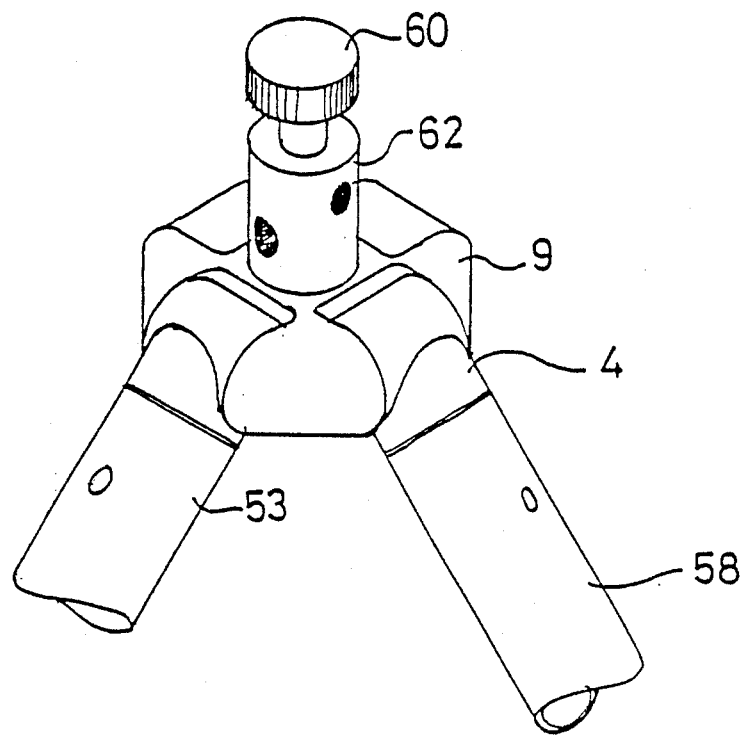
Figure 23:
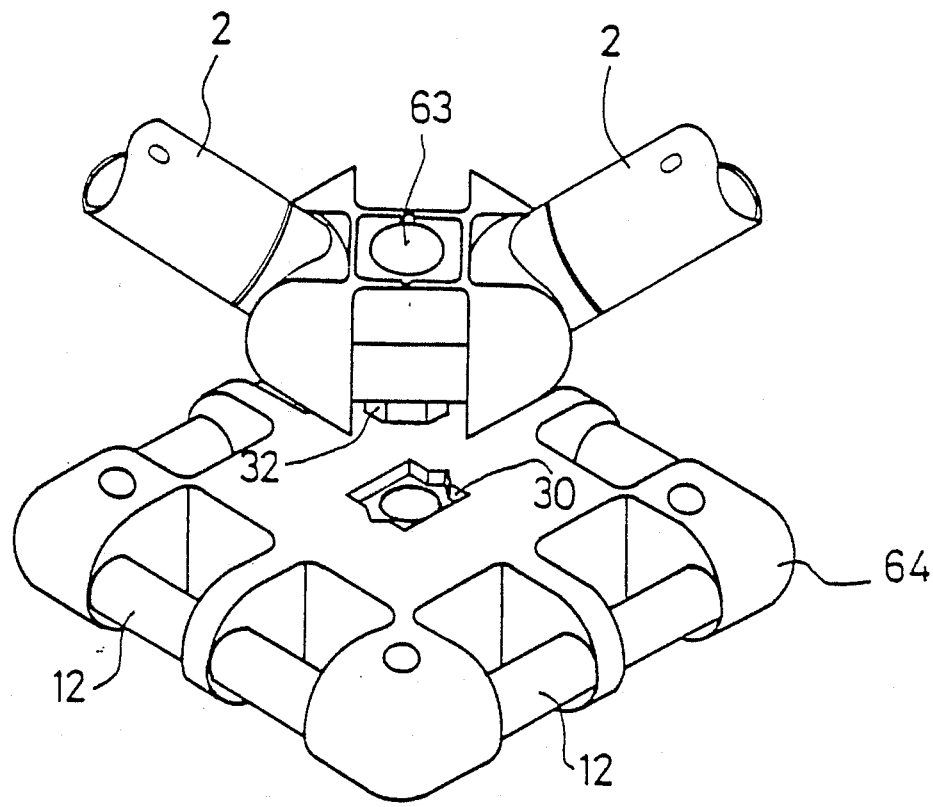

Further advantages and individual features of the invention will be apparent from the following description and the drawings showing various embodiments which are described in greater detail hereinafter. In the drawings:

FIG. 1 shows a connecting element with the gripping means opened, prior to being inserted into the end of a tube, FIG. 2 shows the connecting element of FIG. 1 in the closed condition in which it is inserted into the end of the tube, FIG. 3 is a view from below on to the upper half of the connecting element shown in FIG. 1, FIG. 4 is a side view of the half connecting element shown in FIG. 3, FIG. 5 is a view from above on to the half connecting element shown in FIG. 3, FIG. 6 shows a modified embodiment of a connecting element in the open and in the closed conditions, FIG. 7 shows a connecting element for accommodating a screw, FIG. 8 is a view in cross-section through a connection involving three tube ends, FIGS. 9 and 10 show a modified embodiment of a connecting element without longitudinal division, FIG. 11 is a plan view of a core portion, FIG. 12 is a view in cross-section through half a core portion, taken along line I—I in FIG. 11, FIG. 13 is a view in cross-section through the core portion, taken along line II—II in FIG. 11, FIG. 14 is a small core portion, FIG. 15 is a view in cross-section through the core portion shown in FIG. 14, FIG. 16 is a side view on to the end of a tube with a corrugated surface configuration on a greatly enlarged scale, FIG. 17 is a diagrammatic view of a framework comprising mutually intersecting frames, FIG. 18 shows a basic element with different connecting options and connecting elements, as a perspective view, FIG. 19 shows a basic element with plates fixed to the limbs of the frame, FIG. 20 shows an element comprising four interconnected pairs of bars, FIG. 21 shows four interconnected pairs of bars with a pyramidlike bar structure, FIG. 22 shows a detail of a corner of a pyramid, FIG. 23 shows a detail of a connection between the pyramid bars, FIG. 24 shows a plan view of a roof construction of quadrangular configuration in plan, FIG. 25 is a side view of the construction shown in FIG. 24.

As illustrated in FIGS. 1 through 5, a typical connecting element 4 comprises the two halves 6 and 6' which are preferably of absolutely identical configuration. The connecting elements are preferably produced from plastics material by an injection moulding process. The two halves 6 and 6' are fitted together at an engagement means so that they can be hingedly opened and closed. As can be seen in particular from FIGS. 3 through 5, the engagement means comprises two side plates 36 which are arranged asymmetrically with respect to the longitudinal centre line and of which at least one is extended downwardly, as can be seen from FIG. 4. Provided on the inward side of each of the side plates 36 is a projection and a depression respectively so that two pairs of side plates which are pushed one into the other engage one into the other. The side plates are of such a configuration that the two halves 6 and 6' can open only as far as a given angle, which simplifies handling and which also ensures that the spring element cannot drop out.

For proper positioning of the two halves, a positioning pin 19 and a positioning bore 20 are provided on respective ones of the halves. With the halves 6 and 6' facing towards each other, the positioning pin 19 respectively engages into the oppositely disposed positioning bore 20. Provided in the shank 3 of the connecting element is a recess 10 which at one point goes into an opening 21. The recess 10 serves to accommodate the spring element 11 which in the present embodiment is in the form of a U-shaped member. Each spring element carries a projection or lug 13 which in the closed condition projects from the opening 21. Arranged at the lower limb of the U-shaped member is a positioning lug or projection 22 which however only partially engages into the opening 21 and which only serves for positioning the spring element 11.

Each connecting element is provided with a gripping means 14 which in the present embodiment comprises two half-shell members 5 and 5'. The two half-shell members are of such a configuration that they can positively engage and grip a shaft or spindle 12. A peripherally extending shoulder 37 delimits the shank 3, the shoulder preferably being of a height which approximately corresponds to the wall thickness or gauge of the tubes.

The bar-shaped element 2 is to be connected with its tube-shaped end to the shaft or spindle 12, by means of the connecting element 4 shown in FIGS. 1 and 2. The element 2 is provided with an opening 8 whose diameter is somewhat greater than the diameter of the projection 13. The connecting element is now opened to such a width that the two half-shell portions 5 and 5' can grip the shaft or spindle 12. The connecting element is then closed, with the projection 13 projecting out of the opening 21. The shank 3 of the closed connecting element is then pushed into the element 2. For that purpose the projection 13 is pressed inwardly until it reaches the opening 8 where it engages into a retaining or detent position, as a result of the spring force, as shown in FIG. 2. In order to remove the connecting element from the element 2, the projection 13 has to be pressed inwardly again so that the locking action is released. That can be effected in a very simple manner by hand or also by means of a screw driver or the like.

The shaft or spindle 12 or the half-shell portions 5 could also be for example of a hexagonal or quadrangular cross-section so that it would not be possible for the shaft or spindle to rotate when the connecting element is closed.

FIG. 6 shows an alternative embodiment of a connecting element 4 in which, although it is also divided in half, the two halves are connected together at a hinge 23. The hinge 23 may be formed for example by a thin film of material. The two halves are held together by a press stud 24 which can be pressed into the adjacent press stud opening 25. In this case also the spring element 11 is enclosed in the recess 10 and can only be removed when the connecting element is in an open condition.

FIG. 7 shows a connecting element in the form of a screw clamp 38. The screw clamp also comprises the two halves 6 and 6' which are hingedly connected together at one end. No separate locking latch member is inserted in this scrw gripping arrangement. The projection 13 is fixedly arranged on the upper half 6. The spring force is produced by the two halves which have a tendency to open. Arranged in the two halves 6 and 6' in the axial direction is a screwthreaded bore 27 into which a screw 26 can be screwed, in the closed condition of the device. Instead of the screwthread pitches, it would also be possible only to provide individual ribs or projections which retain the screw or a pin which is also ribbed and which is knocked into position.

FIG. 8 shows a view in cross-section through a typical combination of connecting elements. Such a combination generally occurs at the corner of an individual frame of a framework construction. A screw clamp 38 is fitted into a horizontally extending tube element 2. The screw clamp 38 is constructed substantially as shown in FIG. 7 and has only one axially extending bore 39 as the gripping means. Inserted in the vertically extending tube 2' is a connecting element 4 whose gripping means partially engages into the bore 39 in the screw gripper 38. A further vertical but upwardly directed tube 2" is connected to the junction arrangement by a connecting element 4' also being pushed into that tube, with the connecting element 4' partly engaging into the bore in the connecting element 4. The entire connection is held together by a socket screw 26 which is screwed into the screwthreaded bore in the screw gripping means 38. It will be seen that even when the screw 26 is tightened, the tubes 2' and 2" can be laterally pivoted, thus providing a pivotal connection.

FIGS. 9 and 10 show an alternative embodiment of a connecting element which is not divided into two halves but which is of a onepiece configuration. The recess 10 is open at one side so that the spring element 11 which is fitted thereinto is supported with the projection 13 in the inserted condition, by the wall of the tube 2. The gripping means 14 is in the form of a simple through bore which extends transversely with respect to the tube axis. Preferably there are two bores of different diameters so that for example a screw head can be countersunk, as shown in FIG. 8.

FIGS. 11 through 13 show a core portion 9 to which a plurality of bar-shaped elements can be connected. For production process reasons, that component is also split into two halves which are of the same configuration and which can be fitted one into the other, as shown in particular in FIG. 13. For that purpose, diametrally oppositely disposed pins 28 and bores 29 are provided on the inward sides. Arranged at the peripheral region of the member 9 on each side thereof are respective pairs of spindle-like portions 12 and 12' whose width corresponds to the width of a respective gripping means. Disposed at the centre is a depression 30 which for example can non-rotatably accommodate a hexagonal body. The through hole 31 and the bores 66 serve for receiving a screw for connecting the core portion to other components.

Instead of screws it would be possible to use a press stud 67 having two resilient lugs 68 which can be compressed. The same press stud could also be fitted through the closed holding bars of a connecting element.

FIGS. 14 and 15 show another type of core portion which is somewhat smaller and which has only a single spindle portion 12 at each side. Arranged on one side is a hexagonal flange 32 which fits positively into the depression 30 in the core portion shown in FIG. 11. The depression 33 serves to accommodate a screw head. It will be appreciated that the core portions may also be of other configurations and may be for example hexagonal, triangular or in the form of a polyhedron.

FIG. 16 shows a preferred cross-sectional configuration of a bar-shaped element 2. The tube body portion 34 is provided with individual grooves 35 in the longitudinal direction. The tube body portion is preferably provided with individual grooves 40 over its entire periphery, thus providing a certain degree of resiliency in the radial direction. At the same time however torsional strength and buckling strength in the axial direction are also increased.

FIG. 17 is a diagrammatic view of a framework which is built up from a plurality of mutually intersecting pairs of bars and which can be folded together. The framework comprises individual frame units, as described with reference to FIG. 18.

In that connection, a framework may essentially comprise two mutually intersecting, planar and rectangular frames 17, wherein the frame sides 18 are formed by the bar-like elements 2 which intersect at the intersections 16. The ends of the elements are connected together by the above-described connecting elements. The framework may be fixed in a given position for example by a stabilising portion 41. The bar-shaped elements are only referred to hereinafter as tubes, for the sake of simplicity. A bore 42 which passes through the entire tube is arranged at the intersection 16. As indicated in the drawing, provided in the middle region of the tube are preferably a plurality of bores so that the two tubes can also cross outside their centre. A snap connector 43 or a connecting screw 44 can be fitted into the bore 42.

The snap connector comprises two members which can be pressed together in a press stud-like manner. The two members are provided with a pin 45 which can be fitted into the bores 42 in the two tubes. As the tubes of the frame 17' are arranged on the inside of the frame 17, the two members forming the snap connector 43 remain pressed together and the pins 45 cannot slip out.

If the intersections 16 are subjected to a high level of mechanical loading, a connecting screw 44 is preferably used, with the connection being secured by means of a lock nut 46. Arranged between the two crossing tubes are bearing discs 47 of which one side is adapted to the outside surface configuration of the tube so as to ensure the maximum degree of stability.

The corner connection 48 corresponds for example approximately to the connection shown in FIG. 8, while if required it is also possible to add spacer sleeves 49. The spacer sleeves are required in particular to compensate for the thickness of a tube in the plane of two mutually intersecting tubes.

For the purposes of connecting individual framework members to another framework, it is possible to provide individual connecting bars 50 whose ends are provided with a tube coupling 51, which can be engaged into position by a detent action. The tube couplings can be snap-fitted on to the corner of a frame, as illustrated.

A corner member 52 provides a further option in regard to connection to a basic frame element. The corner member 52 may either be fixed or in the form of a hinge.

FIG. 19 shows a framework construction which is built up approximately as shown in FIG. 18 and in which the frames are provided with sheets 53 and viewing panels 54. Clamps 55 which can be snap-fitted on to the tubes are used for fixing purposes in that arrangement.

FIGS. 20 and 21 show framework structures in which the basic shape does not consist of mutually intersecting flat pairs of frames. On the contrary, individual pairs of bars or shears-like or scissors-like assemblies 56 are connected together to form closed units in a polygonal configuration. FIG. 20 shows a closed unit of that kind, consisting of the four scissor-like assemblies 56a, 56b, 56c and 56d. The ends of the assemblies 56 are pivotally connected together by means of the large core portions 9. In this case the purpose of the two juxtaposed spindle portions 12 and 12' will be particularly clear. As the individual tubes of the assemblies 56 are each displaced relative to each other by the thickness of the tube, it is necessary to provide for connection to a spindle portion 12 or 12' alternately. Each closed unit can be folded together to from a structure in which all bars of the individual assemblies 56 extend almost parallel to each other and are disposed closely adjacent to each other. In that case each individual scissor-like assembly performs a pivotal movement about the intersection 16, as indicated by the arrow A.

For the purposes of stabilising a closed unit, two core portions 9 are connected by a spacer tube 57. The spacer tube may be connected to the shafts or spindles 12, as shown in FIG. 20, or in the centre of the core portions 9, as shown in FIG. 21. The spacer tube may be provided on both sides with the above-mentioned press stud.

FIG. 21 again shows a closed unit comprising four interconnected shears-like or scissor-like assemblies 56a, 56b, 56c and 56d, as already illustrated in FIG. 20. However the closed unit is strengthened by a pyramid-like bar structure, wherein each bar 58 of that bar structure is connected to a junction between two scissor-like assemblies. The pyramid bars 58 meet at the pyramid tip 59 and are there connected to form a junction, as shown for example in FIG. 22. FIG. 21, on theleft-hand side thereof, shows part of a further closed unit with a pyramid tip 59'. The pyramid-like bar structures serve to strengthen the closed units in the horizontal plane so that it is possible to build for example roof constructions. The adjacent pyramid tips 59, 59; etc are preferably connected together by way of a cable 61. It will be appreciated that instead of the cable it is also possible to use a further bar or a surface member. However the cable has the advantage that the entire framework can be folded together, with the cable hanging down loose in the folded-together condition. It will be seen that the length of the pyramid bars 58 must be so selected that they do not hinder the folding-together movement of the assemblies 56. On a roof construction, the pyramid tips may be directed both upwardly and downwardly or in both directions. The sag of a roof construction can be corrected by means of the cable 61. The pyramid tips further afford another connecting plane on which further structures can be built up by means of core portions.

FIG. 22 shows pyramid tip, with the core portion 9 being provided with a cable holder or mounting 62. A cable can be passed through the holder 62 and clamped fast by a fixing screw 60.

FIG. 23 shows the combination of two core portions as shown in FIGS. 11 and 14. In that connection the small core portion 63 is fitted into the large core portion 64, with the hexagonal flange 32 engaging into the depression 30. The two members 63 and 64 are force-lockingly connected together by a fixing screw (not shown).

FIGS. 24 and 25 show a construction which has horizontal extension, consisting of a plurality of closed units 65 which are connected together in a row. The pyramid bars 58 are represented in the form of broken lines. The cables 61 connect the adjacent pyramid tips together in a straight line.

The framework constructions described and illustrated herein only represent specific embodiments. It will be seen that an almost unlimited number of different three-dimensional forms with a different basic pattern or configuration can be built up. Thus it is also possible in particular to erect dome-like structures which for example with a suitable covering or cladding can serve as emergency accomodation.

I claim:

1. A framework comprising bar-shaped elements (2) which can be put together to provide a three-dimensional structure, wherein the ends of the bar-shaped elements are of a tubular configuration and have at least one opening (8) in the peripheral portion of the tube and are provided with connecting elements (4) having a shank (3) which can be pushed into the ends, wherein arranged on the shank of the connecting elements is a projection (13) which can be engaged into the opening, characterised in that the shank (3) has a recess (10) in which a spring element (11) carrying the projection (13) is mounted, that the connecting elements (4) have a connecting portion, which projects out of the end of the tube, with a gripping means (14), that the connecting elements (4) are split in the plane of the axis of the tube, and that the gripping means (14) comprises two half-shell portions (5,5') which are closed together when the shank (3) is pushed in so as to grip a member between them.

2. A framework comprising bar-shaped elements (2) which can be put together to provide a three-dimensional structure, wherein the ends of the bar-shaped elements are of a tubular configuration and have at least one opening (8) in the peripheral portion of the tube and are provided with connecting elements (4) having a shank (3) which can be pushed into the ends, wherein arranged on the shank of the connecting elements is a projection (13) which can be engaged into the opening, characterised in that the shank (3) has a recess (10) in which a spring element (11) carrying the projection (13) is mounted, that the connecting elements (4) have a connecting portion, which projects out of the end of the tube, with a gripping means (14), and that the spring element (11) is in the form of a U-shaped member of resilient material and of which one limb carries the projection (13) and the other limb bears against the floor of the recess (10).

3. A framework according to claim 1 characterised in that the two halves of the connecting elements are separate members which can be fitted together at one end by means of an integral engagement means (7) and in that way are hingedly interconnected.

4. A framework according to claim 3 characterised in that the recess (10) in the shank is formed as a hollow space in the two halves (6,6') of the connecting elements (4), which encloses the spring element (11).

5. A framework according to claim 1 characterised in that the gripping means (14) can be connected to a core portion (9) which is provided on its outside with coupling means which fit positively into the half-shell portions (5,5').

6. A framework according to claim 5 characterised in that the core portion (9) is substantially quadrangular and on each side has a respective pair of spindle-like portions, each of which can accommodate a gripping means (14).

7. A framework according to claim 1 characterised in that the bar-shaped elements (2) at least partially intersect in a scissors-like arrangement and that the pivotal connection at the points of intersection (16) is releasable.

8. A framework according to claim 7 characterised in that it has a basic element comprising two mutually intersecting planar and rectangular frames (17, 17'), wherein the elements which intersect in a scissors-like arrangement form respective parallel frame sides.

9. A framework according to claim 8 characterised in that at least three pairs of bars which mutually intersect in a scissors-like arrangement are pivotally connected together at their ends to form a closed unit.

10. A framework according to claim 9 characterised in that each closed unit of the interconnected pairs of bars is strengthened with a pyramid-like bar structure (58), wherein at least two bars of the bar structure are connected to a respective connecting location between two pairs of bars.

11. A framework according to claim 10 characterised in that a plurality of closed units of interconnected pairs of bars are arranged in a row in a plane and that at least a portion of the tips (59) of the pyramid-like bar structures (58) associated therewith are connected together by way of a cable (61) or by way of a further bars or by way of a plate.

12. A framework according to claim 1 characterised in that the bar-shaped elements (2) are tubes whose tube body is provided with axially extending grooves (35).

13. A framework according to claim 12 characterised in that the tube body is of a corrugated configuration (40) in cross-section.

14. A framework according to claim 3 wherein said integral engagement means comprises two side plates (36) which are arranged asymmetrically on each of the two halves with respect to the longitudinal center line, and wherein the side plates of each half include a projection and a depression, respectively, such that the side plates of the two halves interleave with each other with respective projections engaging in respective depressions.

* * * * *